UNITED STATES PATENT OFFICE.

FRIEDRICH FUCHS AND HERMANN GUSSMANN, OF HÖCHST-ON-THE-MAIN, GERMANY, ASSIGNORS TO THE FARBWERKE, VORMALS MEISTER, LUCIUS & BRÜNING, OF SAME PLACE.

BLACK SULFUR DYE AND PROCESS OF MAKING SAME.

SPECIFICATION forming part of Letters Patent No. 626,897, dated June 13, 1899.

Application filed March 26, 1898. Serial No. 675,306. (Specimens.)

*To all whom it may concern:*

Be it known that we, FRIEDRICH FUCHS, doctor of philosophy, and HERMANN GUSSMANN, doctor of philosophy, both subjects of the Emperor of Germany, and residing at Höchst-on-the-Main, Germany, have invented certain new and useful improvements in the manufacture of a black direct-dyeing cotton-dyestuff by melting dinitranilin 1.2.4 or diamidonitrobenzene 1.2.4 with sulfur and alkaline sulfids, of which the following is a specification.

This invention relates to the production of a black direct-dyeing cotton-dyestuff.

We illustrate our process by the following examples: Eighteen kilograms of sodium sulfid and seven kilograms of sulfur are heated to about 150° centigrade in an iron vessel on the oil-bath. The sulfur being dissolved and the melt having begun to boil, which generally takes place within half an hour, six kilograms of dinitranilin 1.2.4 are gradually added with good stirring, and then the heating is continued for about four hours up to 180° to 190° centigrade till the mass begins to solidify. The melt is then taken out, broken up, and roasted for four hours in a flat iron pan in an oven at a temperature of 230° to 240° centigrade, or eight kilograms of diamidonitrobenzene 1.2.4 are introduced into a molten mixture of twenty-two kilograms of sodium sulfid and eight kilograms of sulfur and then the process carried out as above. In this manner a black porous mass of weak metallic luster is obtained, which when ground can be used directly for dyeing purposes.

The dyestuff represents a black somewhat hygroscopic powder, easily soluble in water, from which solution, on addition of acids, it is again entirely separated in form of a black precipitate which is also easily soluble in sulfur or caustic alkalies.

The dyestuff is insoluble in concentrated sulfuric acid. It dyes unmordanted cotton even in the cold, which distinguishes it from the "Noir Vidal." The dyeings are characterized by their fastness to alkalies, acid, and light.

Having now described our invention, what we claim is—

1. The process herein described of producing black direct-dyeing cotton-dyestuffs, which consists in heating dinitranilin 1.2.4 with sulfur and alkaline sulfids at higher temperatures, substantially as set forth.

2. As a new product the black direct-dyeing cotton-dyestuff derived from the nitro body hereinbefore described, being a black somewhat hygroscopic powder, easily soluble in water, from which on addition of acids it is entirely separated in form of a black precipitate, easily soluble in alkaline sulfids and caustic alkalies, insoluble in concentrated sulfuric acid, dyeing unmordanted cotton even in the cold, which distinguishes it from the "Noir Vidal," the dyeings being characterized by their fastness to alkalies, acids and light, substantially as set forth.

In testimony that we claim the foregoing as our invention we have signed our names in presence of two subscribing witnesses.

FRIEDRICH FUCHS.
HERMANN GUSSMANN.

Witnesses:
HEINRICH HAHN,
BERNHARD LEYDECKER.